US008776120B2

(12) United States Patent
Lee et al.

(10) Patent No.: US 8,776,120 B2
(45) Date of Patent: Jul. 8, 2014

(54) REMOTE CONTROLLER WITH MULTIMEDIA CONTENT DISPLAY AND CONTROL METHOD THEREOF

(75) Inventors: Dong-heon Lee, Seoul (KR); Yong-hwan Kwon, Seongnam-si (KR); Joon-hwan Kim, Yongin-si (KR); Heui-jin Kwon, Seongnam-si (KR); Chang-soo Lee, Seoul (KR); Jeong-yeon Lee, Seongnam-si (KR); Victor Szilagyi, London (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/717,223

(22) Filed: Mar. 4, 2010

(65) Prior Publication Data
US 2010/0229196 A1 Sep. 9, 2010

(30) Foreign Application Priority Data

Mar. 4, 2009 (KR) .................. 10-2009-0018504
Sep. 3, 2009 (KR) .................. 10-2009-0083203

(51) Int. Cl.
*H04N 5/445* (2011.01)
*H04N 7/18* (2006.01)
*H04N 5/44* (2011.01)

(52) U.S. Cl.
USPC .................. 725/39; 725/78; 725/83; 725/82; 348/734

(58) Field of Classification Search
CPC ......... G06F 1/1626; H03J 9/00; H04B 1/205; H04M 1/72533; H04N 21/4126; H04N 21/42204; H04N 21/42207; H04N 21/42208; H04N 21/4222

USPC .............. 348/734; 725/37, 39, 110, 131, 133, 725/139, 141, 151, 153
See application file for complete search history.

(56) References Cited

U.S. PATENT DOCUMENTS

| 4,623,887 | A | * | 11/1986 | Welles, II .................... 340/12.24 |
| 4,959,810 | A | * | 9/1990 | Darbee et al. ................. 398/112 |
| 5,481,256 | A | * | 1/1996 | Darbee et al. ................. 341/176 |
| 5,614,906 | A | * | 3/1997 | Hayes et al. ................... 341/176 |
| 5,959,751 | A | * | 9/1999 | Darbee et al. ................. 398/112 |
| 6,014,092 | A | * | 1/2000 | Darbee et al. .................... 341/23 |

(Continued)

OTHER PUBLICATIONS

Daniel Tonks: "Compaq iPAQ H3950 / UEI Nevo Remote Control" [Online] Oct. 12, 2007, XP002606456; Retrieved from the Internet: URL:http://web.archive.org/web/20071012182703/ http://www.remotecentral.com/nevo/index.html [retrieved on Oct. 21, 2010] 12 pages.

(Continued)

*Primary Examiner* — An Son P Huynh
(74) *Attorney, Agent, or Firm* — Sughrue Mion, PLLC

(57) ABSTRACT

Provided are a remote controller and a method of controlling the remote controller, wherein the remote controller is operable to be in one of a first operating mode or a second operating mode, and which is connectable to a docking station, the remote controller including: an internal display screen, which displays at least one digital image; and a controller which may be operable to change between the first and second operating modes, wherein if the remote controller is connected to the docking station and if the remote controller is in the second operating mode, the controller controls the remote controller to change to the first operating mode to provide predetermined multimedia content.

38 Claims, 8 Drawing Sheets

(56) References Cited

U.S. PATENT DOCUMENTS

| | | | |
|---|---|---|---|
| 6,195,589 B1* | 2/2001 | Ketcham | 700/28 |
| 6,225,938 B1* | 5/2001 | Hayes et al. | 341/176 |
| 6,496,122 B2* | 12/2002 | Sampsell | 340/4.42 |
| 6,882,299 B1* | 4/2005 | Allport | 341/176 |
| 6,989,763 B2* | 1/2006 | Wall et al. | 340/12.25 |
| 7,086,081 B2* | 8/2006 | Martinez et al. | 725/133 |
| 7,167,913 B2* | 1/2007 | Chambers | 709/223 |
| 7,900,228 B2* | 3/2011 | Stark et al. | 725/45 |
| 8,255,720 B1* | 8/2012 | Conway | 713/320 |
| 2003/0048295 A1 | 3/2003 | Lilleness et al. | |
| 2003/0103088 A1* | 6/2003 | Dresti et al. | 345/835 |
| 2003/0221036 A1* | 11/2003 | Konetski | 710/303 |
| 2004/0119706 A1 | 6/2004 | Sekiguchi et al. | |
| 2005/0017946 A1* | 1/2005 | Park | 345/156 |
| 2006/0012488 A1 | 1/2006 | Hilbrink et al. | |
| 2006/0107295 A1* | 5/2006 | Margis et al. | 725/81 |
| 2007/0037619 A1* | 2/2007 | Matsunaga et al. | 455/575.7 |
| 2007/0115258 A1* | 5/2007 | Cupps et al. | 345/156 |
| 2007/0233929 A1* | 10/2007 | Baik | 710/303 |
| 2008/0001773 A1* | 1/2008 | Rye et al. | 340/825.22 |
| 2008/0066135 A1* | 3/2008 | Brodersen et al. | 725/134 |
| 2008/0077882 A1* | 3/2008 | Kramer et al. | 715/810 |
| 2009/0146909 A1* | 6/2009 | Lection | 345/1.1 |
| 2009/0273705 A1* | 11/2009 | Matsumoto et al. | 348/383 |
| 2009/0322693 A1* | 12/2009 | Sasakura | 345/173 |
| 2010/0173672 A1* | 7/2010 | Kuhl et al. | 455/557 |

OTHER PUBLICATIONS

Daniel Tonks: "Compaq iPAO H3950 / UEI Nevo Remote Control"[Online] Oct. 12, 2007, XP002610622 Wayback Machine; Retrieved from the Internet: URL:http://web.archive.org/web/ ; http://www.remotecentral.com/nevo/index.html [retrieved on Oct. 21, 2010] 1 page.

Communication dated Dec. 1, 2010, issued in counterpart European Patent Application No. 10155300.6.

* cited by examiner

REMOTE CONTROLLER WITH MULTIMEDIA CONTENT DISPLAY AND CONTROL METHOD THEREOF

BACKGROUND OF THE INVENTION

1. Field of the Invention

Apparatuses and methods consistent with the present invention relate to a remote controller and a control method thereof, and more particularly, to a remote controller with a display, and a control method thereof.

2. Description of the Related Art

Generally, a remote controller includes a handheld device which controls an external device such as a video display, Digital Video Disk (DVD) device, or other electronic appliance. Some related art remote controllers may include a display for displaying various items such as control buttons for controlling the external device. However, there is a need for a remote controller having a display, wherein the remote controller is operable to control an external device, and is also operable to receive and provide multimedia content.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an exemplary aspect of the present invention, there is provided a remote controller, which may be operable to be in one of a first operating mode or a second operating mode, and which may be connectable to a docking station, the remote controller including: an internal display screen, which displays at least one digital image; and a controller which is operable to change between the first and second operating modes, wherein if the remote controller is connected to the docking station and if the remote controller is in the second operating mode, the controller controls the remote controller to change to the first operating mode to provide predetermined multimedia content.

According to an exemplary aspect of the present invention, wherein the internal display screen may be a touchscreen and may be operable to receive at least one command from a user.

According to an exemplary aspect of the present invention, the remote controller may be operable to control an external device.

According to an exemplary aspect of the present invention, the external device may be one of a display device, an audio outputting device and a video outputting device.

According to an exemplary aspect of the present invention, the remote controller may further comprise a battery which stores power for operating the remote controller, wherein the docking station provides the power to the battery if the remote controller is connected to the docking station.

According to an exemplary aspect of the present invention, if the predetermined multimedia content is at least one digital image, the controller may control the internal display screen to display the at least one digital image.

According to an exemplary aspect of the present invention, if the predetermined multimedia content is audio content, the controller may control the remote controller to play the audio content.

According to an exemplary aspect of the present invention, the predetermined multimedia content may include different types of content, and if the controller controls the remote controller to change to the first operating mode, the predetermined multimedia content may be provided such that each of the different types of content are provided in a cyclical format.

According to an exemplary aspect of the present invention, a predetermined priority may be selected for each of the different types of content, and each of the different types of content may be provided in the cyclical format according to the respective predetermined priorities selected for the different types of content.

According to an exemplary aspect of the present invention, the predetermined multimedia content may include at least one of: a digital photograph, an electronic message received from a user, electronic program guide (EPG) content received from a content provider, and information relating to current events.

According to an exemplary aspect of the present invention, if the predetermined multimedia content is the digital photograph, the digital photograph may be retrieved from at least one of an internal memory, an external memory and a website.

According to an exemplary aspect of the present invention, if the predetermined multimedia content is the information relating to current events, the information relating to current events may include at least one of news, finance and weather.

According to an exemplary aspect of the present invention, the first operating mode may be a content providing mode, and the second operating mode may be a control mode, wherein the internal display screen may include a larger portion which may include a substantial portion of the internal display screen, wherein the control mode displays on the larger portion at least one of a control screen, wherein the control screen may be operable to control an external device from the remote controller, and electronic program guide (EPG) information, and wherein the content providing mode displays on a substantial portion of the internal display screen the predetermined multimedia content.

According to an exemplary aspect of the present invention, the internal display screen may include a smaller portion, which is separate from the larger portion, wherein in the control mode, the predetermined multimedia content may be displayed on the smaller portion, and wherein in the content providing mode, the at least one of the control screen and the EPG information may be displayed on the smaller portion.

According to an exemplary aspect of the present invention, the remote controller may provide an initial multimedia content before being connected to the docking station, wherein if the remote controller is changed to the first operating mode, the predetermined multimedia content is different than the initial multimedia content, and wherein if the remote controller is in the first operating mode before being connected to the docking station, the remote controller may continue to provide the initial multimedia content after being connected to the docking station.

According to an exemplary aspect of the present invention, if the remote controller is displaying an initial image on the internal display screen and the remote controller is changed to the first operating mode, the controller may control the remote controller to automatically provide the multimedia content and may control the internal display screen to suspend displaying the initial image on the internal display screen.

According to an exemplary aspect of the present invention, if the remote controller is removed from the docking station, the controller may control the remote controller to change to the second operating mode and to resume the displaying the initial image on the internal display screen and may control the remote controller to suspend the providing of the multimedia content.

According to an exemplary aspect of the present invention, the internal display screen may be operable to receive an input command, and if the internal display screen receives the input command while the remote controller in the first operating mode, the controller may control the remote controller to suspend the providing of the multimedia content.

According to an exemplary aspect of the present invention, if the remote controller is in one of the first and second operating modes, the remote controller may be operable to receive an alert including at least one of: an electronic program guide (EPG) alert related to an upcoming show, an electronic message received from a user, and information relating to at least one of least news, finance and weather, wherein if the alert is received, the controller may control the remote controller to display the alert on a portion of the internal display screen.

According to an exemplary aspect of the present invention, there is provided a method of controlling a remote controller, which has an internal display screen that displays at least one digital image, which is operable to be in one of a first operating mode or a second operating mode, and which is connectable to a docking station, the method may include: if the remote controller is connected to the docking station and if the remote controller is in the second operating mode, changing from the second operating modes to the first operating mode to provide predetermined multimedia content.

According to an exemplary aspect of the present invention, the internal display screen is a touchscreen, and the method may further include receiving at least one command from a user through the touchscreen.

According to an exemplary aspect of the present invention, the method may further include transmitting control commands from the remote controller to an external device for controlling the external device.

According to an exemplary aspect of the present invention, the external device may be one of a display device, an audio outputting device and a video outputting device.

According to an exemplary aspect of the present invention, the method may further include storing power in a battery for operating the remote controller, wherein the docking station provides the power to the battery if the remote controller is connected to the docking station.

According to an exemplary aspect of the present invention, the method may further include controlling the internal display screen to display at least one digital image if the predetermined multimedia content is the at least one digital image.

According to an exemplary aspect of the present invention, the method may further include controlling the remote controller to play audio content if the predetermined multimedia content is the audio content.

According to an exemplary aspect of the present invention, the predetermined multimedia content may includes different types of content, and the method may further include if the remote controller changes to the first operating mode, controlling the remote controller to provide the predetermined multimedia content such that each of the different types of content are provided in a cyclical format.

According to an exemplary aspect of the present invention, a predetermined priority may be selected for each of the different types of content, and each of the different types of content may be provided in the cyclical format according to the respective predetermined priorities selected for the different types of content.

According to an exemplary aspect of the present invention, the predetermined multimedia content may include at least one of: a digital photograph, an electronic message received from a user, electronic program guide (EPG) content received from a content provider, and information relating to current events.

According to an exemplary aspect of the present invention, if the predetermined multimedia content is the digital photograph, the digital photograph may be retrieved from at least one of an internal memory, an external memory and a website.

According to an exemplary aspect of the present invention, if the predetermined multimedia content is the information relating to current events, the information relating to current events may include at least one of news, finance and weather.

According to an exemplary aspect of the present invention, the first operating mode may be a content providing mode, and the second operating mode may be a control mode, wherein the internal display screen may includes a larger portion which includes a substantial portion of the internal display screen, wherein the control mode displays on the larger portion at least one of a control screen, wherein the control screen is operable to control an external device from the remote controller, and electronic program guide (EPG) information, and wherein the content providing mode displays on a substantial portion of the internal display screen the predetermined multimedia content.

According to an exemplary aspect of the present invention, the internal display screen may include a smaller portion, which is separate from the larger portion, wherein in the control mode, the predetermined multimedia content is displayed on the smaller portion, and wherein in the content providing mode, the at least one of the control screen and the EPG information is displayed on the smaller portion.

According to an exemplary aspect of the present invention, the remote controller may provide an initial multimedia content before being connected to the docking station, wherein if the remote controller is changed to the first operating mode, the predetermined multimedia content is different than the initial multimedia content, and wherein if the remote controller is in the first operating mode before being connected to the docking station, the remote controller may continue to provide the initial multimedia content after being connected to the docking station.

According to an exemplary aspect of the present invention, if the remote controller is displaying an initial image on the internal display screen and the remote controller is changed to the first operating mode, the method may further include: the remote controller automatically providing the multimedia content and suspending displaying the initial image on the internal display screen.

According to an exemplary aspect of the present invention, if the remote controller is removed from the docking station, the method may further include changing to the second operating mode, resuming the displaying the initial image on the internal display screen and suspending the providing of the multimedia content.

According to an exemplary aspect of the present invention, the internal display screen may be operable to receive an input command, and if the internal display screen receives the input command while the remote controller in the first operating mode, the method may further include suspending the providing of the multimedia content.

According to an exemplary aspect of the present invention, wherein if the remote controller is in one of the first and second operating modes, the method may further include receiving an alert and displaying the alert on a portion of the internal display screen, wherein the alert includes at least one of: an electronic program guide (EPG) alert related to an upcoming show, an electronic message received from a user, and information relating to at least one of least news, finance and weather.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
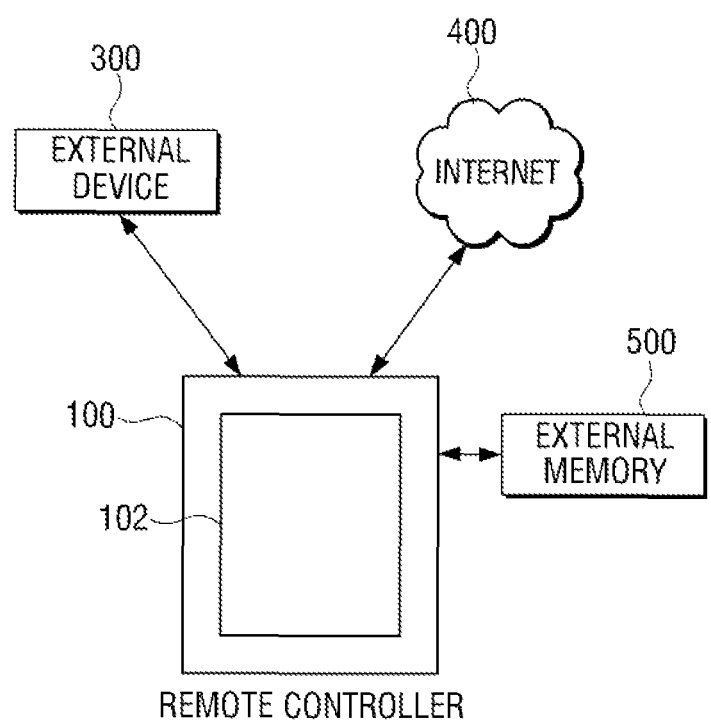
FIG. 1 illustrates various components of a remote controller according to an exemplary embodiment of the present invention.

FIG. 1 illustrates the various components of a remote controller according to an exemplary embodiment of the present invention. As shown therein, the remote controller 100 may connect to a docking station 200 and may control an external device 300.

The remote controller 100 may receive information from an external network, such as the Internet 400. The information received by the remote controller 100 could include multimedia content. As discussed herein, the term "multimedia content" includes, but is not limited to, text, audio, still images, animation, video, and interactivity content forms, electronic program guide (EPG) content from a content provider, electronic messages received from users, information relating to current events, etc. Multimedia content can be transmitted to the remote controller 100 from remote databases or websites such as Flickr©, Picasa©, Facebook©, etc. The information relating to current events could include information such as news, weather and/or financial information, such as stock prices and other market data.

Additionally, as shown in FIG. 1, the communication with the Internet 400 and the external memory 500 can be bi-directional. That is, the remote controller 100 may be operable to both receive data from and transmit data to the Internet 400 and the external memory 500. For example, the remote controller 100 may be operable to respond to alerts received from the Internet 400, or to move multimedia content from the Internet 400 to the internal 101 or external memory 500 (or vice versa). Likewise, the remote controller 100 may send data to and receive data from the external device 300.

The external device 300 may include a video display such as a television or monitor. Alternatively, the external device may include a device which outputs audio and/or video, such as a set-top box, stereo, an iPod© or other MP3 players, a CD or DVD player/recorder, a video game console such as Sony PlayStation©, Nintendo Wii© or Microsoft Xbox©. However, the general inventive concept is not limited to these types of external devices. The exemplary embodiments described herein can generally apply to any electronic appliance or device capable of being controlled with a remote controller.

Figure 3:
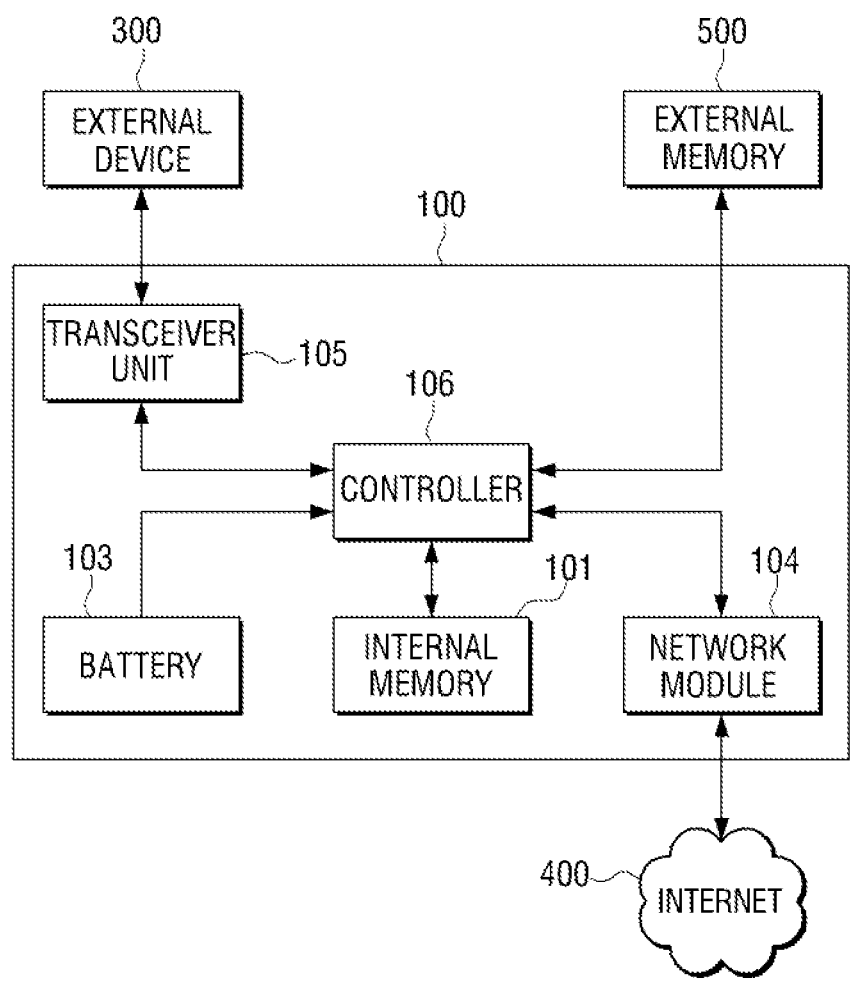
FIG. 3 illustrates a block diagram of a remote controller according to an exemplary embodiment of the present invention.

In addition to receiving multimedia content from the Internet 400, the remote controller 100 may receive multimedia content from an external memory 500 and/or an internal memory 101 (shown in FIG. 3). An internal memory 101 could include, but is not limited to, a computer memory such as random access memory (RAM), flash memory, read only memory (ROM), etc. Likewise, an external memory 500 could include, but is not limited to, hard disk drives (HDDs), compact discs (CD) ROM, memory cards, universal serial bus (USB) flash drives, etc.

Figure 2A:
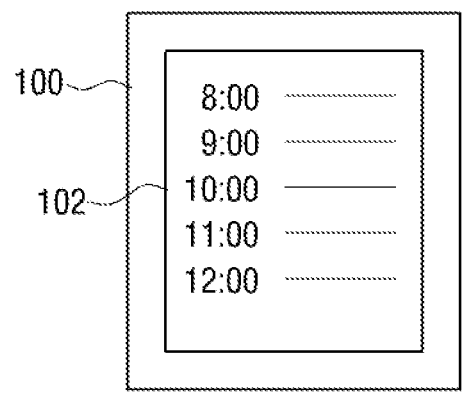
FIG. 2A illustrates an internal display screen of a remote controller according to an exemplary embodiment of the present invention.

FIG. 2A shows an example of an internal display screen 102 of a remote controller 100 according to an exemplary embodiment of the present invention. The internal display screen 102 can be a touchscreen-type display which can detect the presence and location of a touch within the display area of internal display screen 102. Further, the internal display screen 102 can also utilize multi-touch technology. However, the internal display screen 102 does not necessarily have to be a touchscreen-type, and the remote controller 100 can instead utilize other means for receiving input from a user, such as with a keypad or other controlling mechanisms.

Figure 2B:
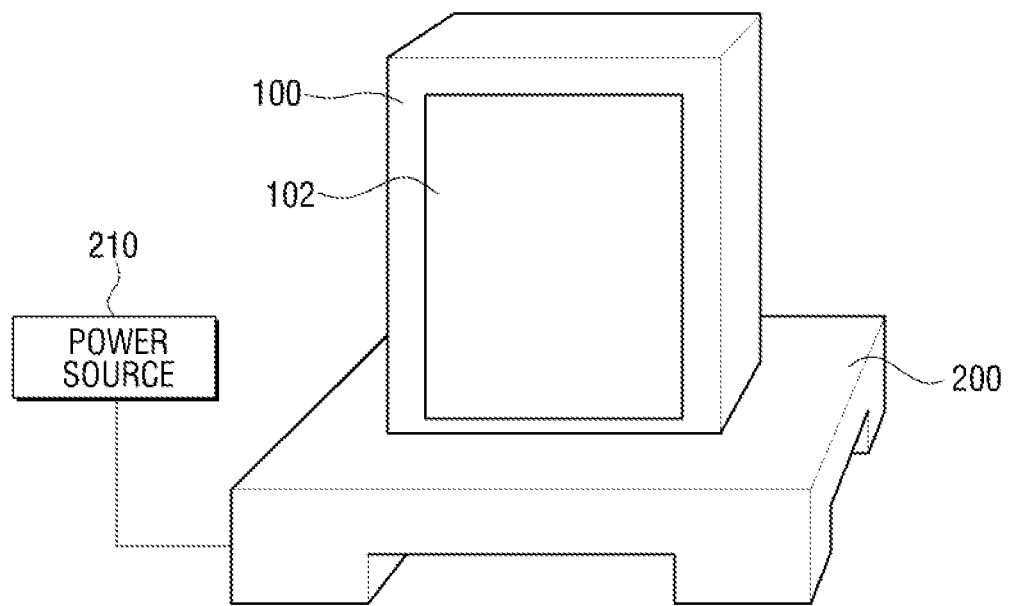
FIG. 2B illustrates a remote controller and docking station according to an exemplary embodiment of the present invention.

FIG. 2B shows an example of a remote controller 100 connected to a docking station 200 according to an exemplary embodiment of the present invention. The docking station can be produced from a variety of materials and can be formed in a variety of shapes and orientations. As shown in the example shown in FIG. 2B, the docking station 200 can connect to and hold the remote controller 100 in an upright, or picture frame-type manner so that the internal display screen 102 to be easily visible by a user.

Furthermore, as shown in the example shown in FIG. 2B, the docking station 200 can be connected to a power source 210. Thus, power source 210 could provide operating and/or charging power to the remote controller 100 via the docking station 200. To accommodate a charging function, the remote controller 100 could include a battery (shown in FIG. 3). Alternatively, the power source 210 need not provide operating and/or charging power to the remote controller 100 only via the docking station 200. For example, the power source 210 might directly connect to the remote controller 100.

The remote controller 100 could detect a connection to the docking station 200, and begin charging automatically upon detecting such connection. Further, the remote controller 100 could detect the presence or absence of a connection to the docking station 200 based on either an electrical or a mechanical mechanism. For example, the remote controller 100 could include an electrical connector (not shown) which connects to an electrical connector on the docking station 200. Upon making a connection with the docking station 200, an electrical signal could be sent from the power source 210 to the docking station 200, and to the remote controller 100 via the respective connectors. Alternatively, the remote controller 100 might employ a mechanical type mechanism which, when connected to the docking station 200, would switch in such a way as to indicate the presence or absence of the connection to the docking station 200.

As shown in FIG. 3, the remote controller 100 can include an internal memory 101 and a battery 103 (as noted above), a network module 104, a transceiver unit 105 and a controller 106.

As noted above, the internal memory 101 may include different types of memory, and can store multimedia content utilized by the remote controller 100. The battery 103 could be used to store charge to supply operating power for the remote controller 100 when not plugged into a power source 210, such as may be provided via the docking station 200. The network module 104 can facilitate communication with an external network such as the Internet 400 or a local area network (not shown). The transceiver unit 105 could likewise facilitate communication with the external device 300. For example, the remote controller 100 could transmit control commands from the remote controller 100 to the external device 300 through the transceiver unit 105. Similarly, the transceiver unit 105 could also be operable to receive signals from the external device 300. For example, control of some external devices might require two-way communication with the remote controller 100. Finally, the controller 106 can be utilized so as to control the overall functioning of remote controller 100, including the interaction between all of the above noted components.

According to an exemplary embodiment of the present invention, the remote controller 100 is operable to be in a first or a second operating mode. As an example of a first operating mode, the remote controller 100 could provide multimedia content. For example, the remote controller 100 might display a video or play audio while in the first operating mode. Such a first operating mode might be referred to as a "content providing mode."

By contrast, in a second operating mode, the remote controller 100 could display on the internal display screen 102 a control panel for controlling the external device 300, or an EPG screen relating to programming received from the Internet 400, for example. Such a first operating mode might be referred to as a "control mode."

It should be noted that the general inventive concept of the present invention is not limited to operating in only a first and second mode. Multiple operating modes may be utilized.

Figure 4:
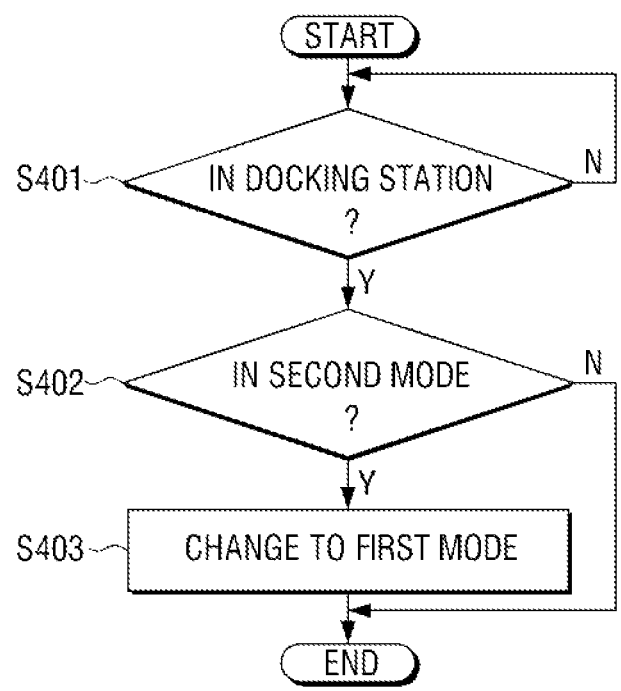
FIG. 4 illustrates a flowchart of the basic operation of remote controller according to an exemplary embodiment of the present invention.

FIG. 4 is a flowchart showing a basic operation of an exemplary embodiment of the present invention. In operation S401, the controller 106 determines whether the remote controller 100 is connected to the docking station 200. If a connection to the docking station 200 is determined to exist (S401-Y), in operation S402 the controller 106 determines whether the remote controller 100 is in the second operating mode. If it is determined the remote controller 100 is not in the second mode (S402-N), the process ends. On the other hand, if the controller 106 determines the remote controller 100 is in the second operating mode (S402-Y), the controller 106 controls the remote controller 100 to change to the first mode.

Figure 5:
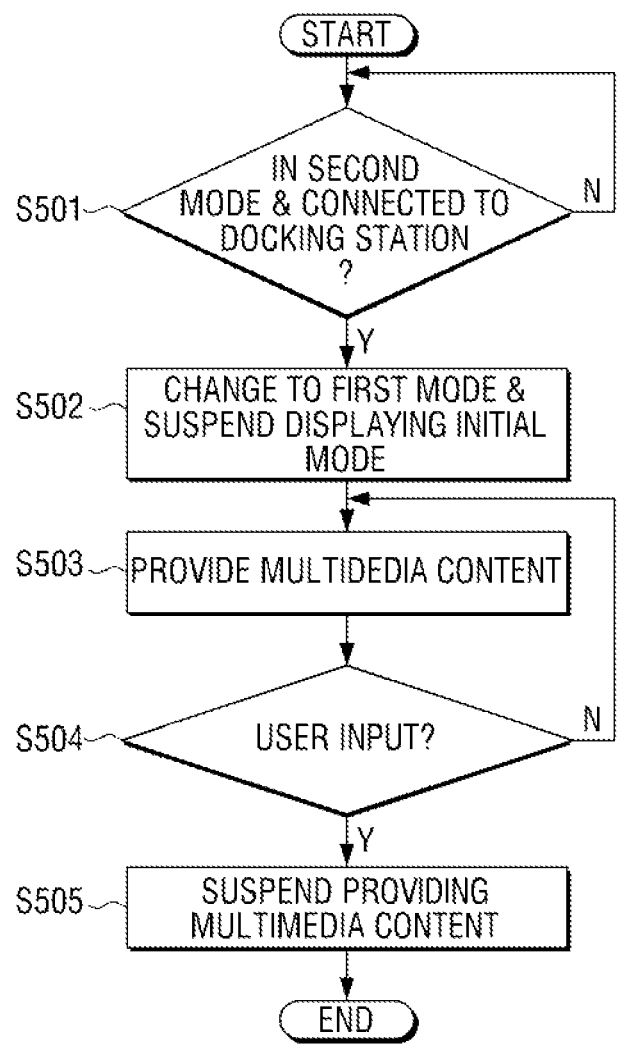
FIG. 5 illustrates a flowchart of the operations of suspending displaying of an initial image and providing multimedia content in response to connecting the remote controller to the docking station, and then suspending the providing of the multimedia content in response to a user input, according to an exemplary embodiment of the present invention.

FIG. 5 is a flowchart showing another basic operation of an exemplary embodiment of the present invention. Whenever the controller 106 determines the remote controller 100 is in the second mode and connected to the docking station 200 (S501-Y), the controller 106 then controls the remote controller 100 to change to the first mode and suspend displaying an initial image which may be displayed on the internal display screen 102 (S502). The controller 106 then controls the remote controller 100 to begin providing multimedia content (S503). If during the providing the multimedia content (S503), the controller 106 senses user input to the remote controller 100 (S504-Y), the controller 106 then controls the remote controller 100 to suspend providing the multimedia content (S505).

As noted above, the internal display screen could include a touchscreen which receives user input, or the remote controller 100 might include a keypad or other controlling mechanisms for receiving user input.

Figure 6:
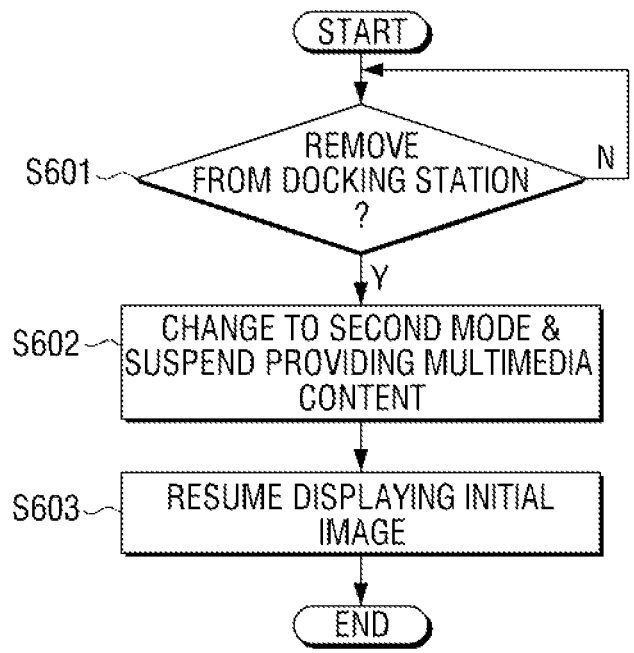
FIG. 6 illustrates a flowchart of the operations of suspending providing multimedia content, and then resuming displaying an initial image in response to removing the remote controller from the docking station, according to an exemplary embodiment of the present invention.

FIG. 6 is a flowchart showing another basic operation of an exemplary embodiment of the present invention. In operation S601, the controller 106 determines whether the remote controller 100 has been removed from the docking station 200. If the remote controller 100 has been removed from the docking station 200 (S601-Y), the controller 106 controls the remote controller 100 to change to the second mode, and suspend providing multimedia content (S602), and then to resume displaying the initial image (S603).

Figure 7:
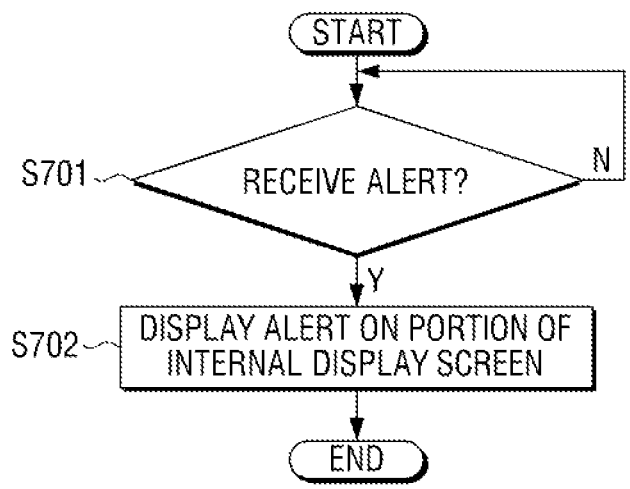
FIG. 7 illustrates a flowchart of the operations of providing multimedia content, receiving an alert, suspending the providing multimedia content and displaying the alert, according to an exemplary embodiment of the present invention.

FIG. 7 is a flowchart showing another basic operation of an exemplary embodiment of the present invention. If the remote controller 100 is in one of the first and second operating modes, the remote controller 100 is operable to receive an alert including at least one of an electronic program guide (EPG) alert related to an upcoming show, an electronic message received from a user, and information relating to at least one of least news, finance and weather, wherein if the alert is received, the controller 106 controls the remote controller 100 to display the alert on a portion of the internal display screen 102.

As noted above, an exemplary embodiment of the present invention includes two different operating modes, a content providing mode, and a control mode. As suggested above, the remote controller 100 might display a video or play audio while in the content providing mode. Similarly, as suggested above, the remote controller 100 might display on the internal display screen 102 a control panel for controlling the external device 300, or an EPG screen relating to programming received from the Internet 400 while in the control mode.

However, the operation in each mode does not have to be limited to displaying only one type of information. That is, the remote controller 100 might operate in multifunctional operating modes. For example, while in the content providing mode, the remote controller 100 might display multimedia content in a substantial portion of the internal display screen, and simultaneously display information which might be shown in the control mode (e.g., a control panel for controlling the external device 300, or an EPG screen relating to programming received from the Internet 400) in a smaller portion of the internal display screen.

Similarly, while in the control mode, the remote controller 100 might display a control panel for controlling the external device 300, or an EPG screen relating to programming received from the Internet 400, in a substantial portion of the internal display screen, and simultaneously display information which might be shown in the content providing mode (e.g., multimedia content) in a smaller portion of the internal display screen.

Figure 8A:
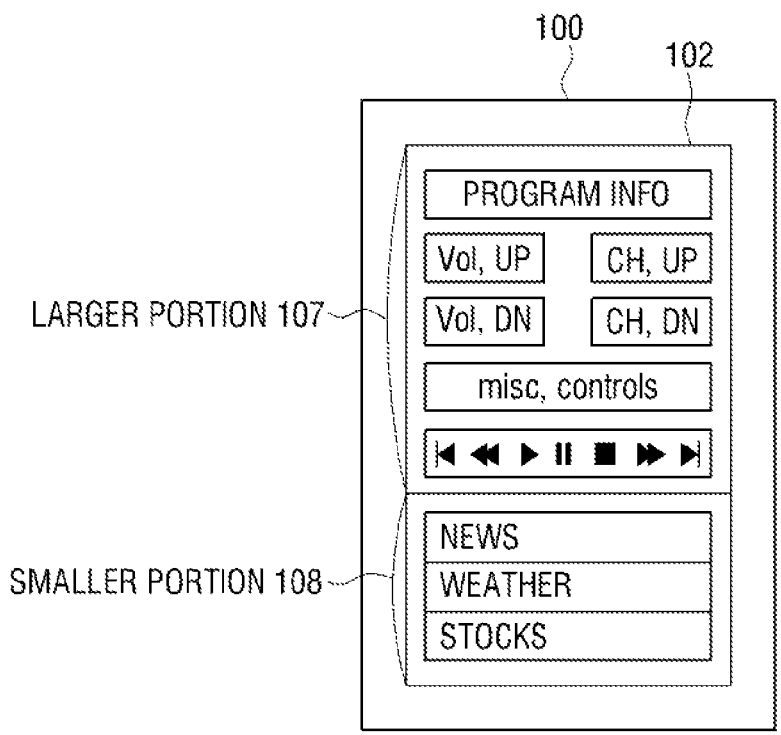
FIG. 8A illustrates the internal display screen while the remote controller is operating in a control mode according to an exemplary embodiment of the present invention.
Figure 8B:
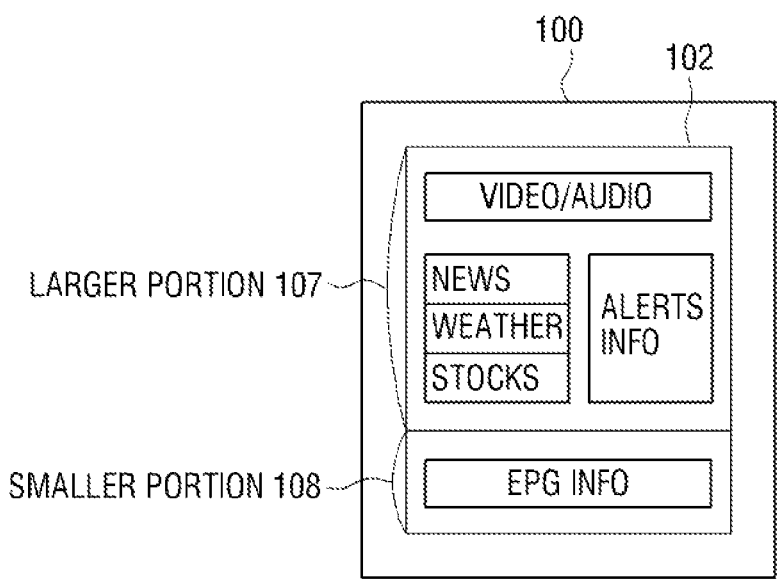
FIG. 8B illustrates the internal display screen while the remote controller is operating in a content providing mode according to an exemplary embodiment of the present invention.

FIGS. 8A and 8B show examples of these types of multifunctional operating modes according to exemplary embodiments of the present invention. As shown in FIG. 8A, while the remote controller 100 is operating in a control mode, a control panel for controlling the external device 300 is displayed on a larger portion 107 of the internal display screen 102. At the same time, multimedia content is displayed on a smaller portion 108 of the internal display screen 102.

Likewise, as shown in FIG. 8B, while the remote controller 100 is operating in a content providing mode, multimedia content is displayed on a larger portion 107 of the internal display screen 102. At the same time, EPG information is displayed on a smaller portion 108 of the internal display screen 102.

Additionally, the predetermined multimedia content may include different types of content. As such, the controller 106 may control the remote controller 100 to change to the first operating mode, whereby each of the different types of content are provided in a cyclical format. Moreover, a predetermined priority may be selected for each of the different types of content, such that each of the different types of content are provided in the cyclical format according to the respective predetermined priorities selected for the different types of content.

Figure 9:
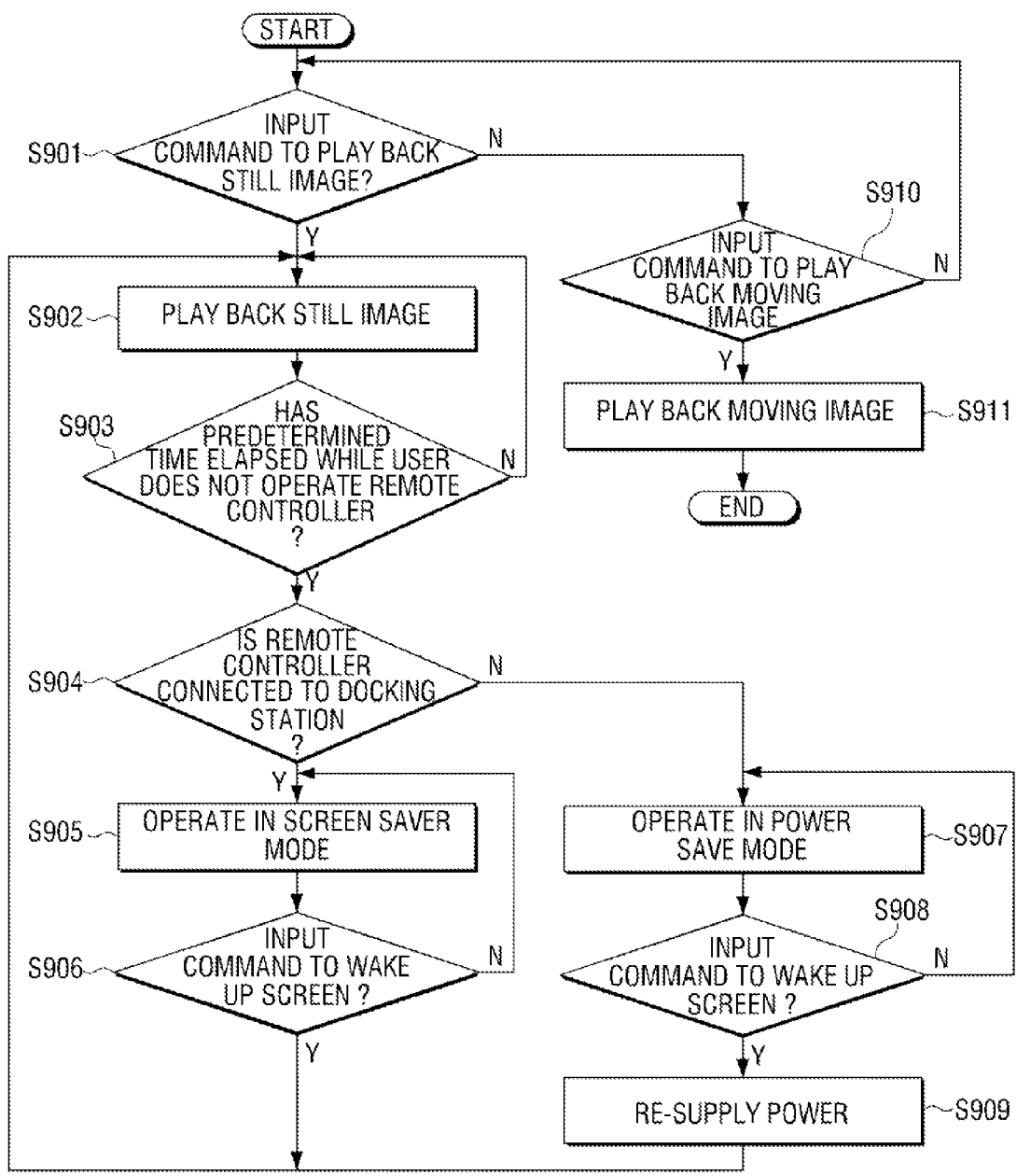
FIG. 9 illustrates a flowchart of the operations of controlling a remote controller according to another exemplary embodiment of the present invention.

Hereinbelow, another exemplary embodiment of the present invention will be explained in detail with reference to FIG. 9. FIG. 9 illustrates a flowchart of the operations of controlling a remote controller according to another exemplary embodiment of the present invention.

As shown in FIG. 9, if a user inputs a command to play back a still image (S901-Y), the controller 106 controls the remote controller 100 to operate in a still image playback mode (S902, S903).

In the still image playback mode, the controller 106 controls the remote controller 100 so that a still image is displayed on the internal display screen 102 (S902), and it is determined that a predetermined time has elapsed while a user does not operate the remote controller 100 (S903).

The predetermined time in operation S903 may be set appropriately as occasion demands.

The still image may be typified as a picture content, but a text content, an EPG screen, a screen for controlling an external device, an Internet browser, a file browser, and other screens for executing application programs may also have the characteristic of the still image. Accordingly, if a user inputs a command to call for/execute the screen having the characteristic of the still image, the command may be treated as the same case as in operation S901, that is, a user inputs the command to play back a still image. If it is determined that a predetermined time has elapsed while a user does not manipulate the remote controller 100 (S903-Y), the controller 106 determines whether the remote controller 100 is connected to the docking station 200 or not (S904).

If it is determined that the remote controller 100 is connected to the docking station 200 (S904-Y), the controller 106 controls the remote controller 100 to operate in a screen saver mode (S905).

In the screen saver mode, the controller 106 controls the remote controller 100 to display a screensaver instead of the still image on the internal display screen 102. The screensaver may be formed as an icon such as a character, clock, or calendar against a dark background. The character, clock, or calendar displayed on the screensaver may be selected by a user according to a user's preference.

If a user inputs a command to wake up a screen (S906-Y), the controller 106 returns to operation S902. The command to wake up a screen in operation S906 may be input by touching the internal display screen 102 of the remote controller 100 or pressing manipulation buttons by a user.

If it is determined that the remote controller 100 is not connected to the docking station 200 (S904-N), the controller 106 controls the remote controller 100 to operate in a power save mode (S907).

In the power save mode, the controller 106 controls the elements constituting the remote controller 100 to consume the minimum power. As the power is not supplied to the internal display screen 102 in the power save mode, the internal display screen 102 displays a black screen.

If a user inputs a command to wake up a screen (S908-Y), the power is re-supplied to the elements constituting the remote controller 100 under the control of the controller 106 (S909). The controller 106 returns to operation S902.

If a user inputs a command to play back a moving image (S910-Y), the controller 106 controls the remote controller 100 to operate in a moving image playback mode (S911).

The moving image playback mode is similar to the still image playback mode, in that the controller 106 controls the remote controller 100 so that a moving image is displayed on the internal display screen 102. However, the moving image playback mode is different from the still image operation mode, in that the controller 106 performs neither the operation of determining a predetermined time has elapsed while a user does not operate the remote controller 100 nor the following operation.

The controller 106 determines whether the remote controller 100 is connected to the docking station 200 or not in operation S904, but the case that the remote controller 100 is directly connected to the power source 210 may also be regarded as satisfying operation S904.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A remote controller, which is operable to be in one of a first operating mode or a second operating mode, and which is connectable to a docking station, the remote controller comprising:

an internal display screen, which displays at least one digital image; and a controller which determines a current operating mode of the remote controller and changes between the first and second operating modes according to whether the docking station is connected and the determined current operating mode of the remote controller, wherein in response to the remote controller being connected to the docking station and the controller determining that the remote controller is in the second operating mode, the controller controls the remote controller to change to the first operating mode to provide predetermined multimedia content, wherein in response to the remote controller being connected to the docking station and the controller determining that the remote controller is not in the second operating mode, the controller controls the remote controller without changing the current operating mode, and wherein the first operating mode is a content providing mode to provide the predetermined multimedia content, and the second operating mode is a control mode to control an external device.

2. The remote controller according to claim 1, wherein the internal display screen is a touchscreen and is operable to receive at least one command from a user.

3. The remote controller according to claim 1, wherein the remote controller is operable to control an external device.

4. The remote controller according to claim 3, wherein the external device is one of a display device, an audio outputting device and a video outputting device.

5. The remote controller according to claim 1, wherein the remote controller further comprises a battery which stores power for operating the remote controller, and wherein the docking station provides the power to the battery if the remote controller is connected to the docking station.

6. The remote controller according to claim 1, wherein if the predetermined multimedia content is at least one digital image, the controller controls the internal display screen to display the at least one digital image.

7. The remote controller according to claim 1, wherein if the predetermined multimedia content is audio content, the controller controls the remote controller to play the audio content.

8. The remote controller according to claim 1, wherein the predetermined multimedia content includes different types of content, and if the controller controls the remote controller to change to the first operating mode, the predetermined multimedia content is provided such that each of the different types of content are provided in a cyclical format.

9. The remote controller according to claim 8, wherein a predetermined priority is selected for each of the different types of content, and each of the different types of content are provided in the cyclical format according to the respective predetermined priorities selected for the different types of content.

10. The remote controller according to claim 1, wherein the predetermined multimedia content includes at least one of:
    a digital photograph,
    an electronic message received from a user,
    electronic program guide (EPG) content received from a content provider, and
    information relating to current events.

11. The remote controller according to claim 10, wherein if the predetermined multimedia content is the digital photograph, the digital photograph is retrieved from at least one of an internal memory, an external memory and a website.

12. The remote controller according to claim 10, wherein if the predetermined multimedia content is the information relating to current events, the information relating to current events includes at least one of news, finance and weather.

13. The remote controller according to claim 1,
    wherein the internal display screen includes a larger portion which includes a substantial portion of the internal display screen,
    wherein the control mode displays on the larger portion at least one of a control screen, which is operable to control an external device from the remote controller, and electronic program guide (EPG) information, and
    wherein the content providing mode displays on a substantial portion of the internal display screen the predetermined multimedia content.

14. The remote controller according to claim 13, wherein the internal display screen includes a smaller portion, which is separate from the larger portion,
    wherein in the control mode, the predetermined multimedia content is displayed on the smaller portion, and
    wherein in the content providing mode, the at least one of the control screen and the EPG information is displayed on the smaller portion.

15. The remote controller according to claim 1, wherein the remote controller provides an initial multimedia content before being connected to the docking station,
    wherein if the remote controller is changed to the first operating mode, the predetermined multimedia content is different than the initial multimedia content, and
    wherein if the remote controller is in the first operating mode before being connected to the docking station, the remote controller continues to provide the initial multimedia content after being connected to the docking station.

16. The remote controller apparatus according to claim 1, wherein if the remote controller is displaying an initial image on the internal display screen and the remote controller is changed to the first operating mode, the controller controls the remote controller to automatically provide the multimedia content and controls the internal display screen to suspend displaying the initial image on the internal display screen.

17. The remote controller apparatus according to claim 16, wherein if the remote controller is removed from the docking station, the controller controls the remote controller to change to the second operating mode and to resume the displaying the initial image on the internal display screen and controls the remote controller to suspend the providing of the multimedia content.

18. The remote controller according to claim 1, wherein the internal display screen is operable to receive an input command, and if the internal display screen receives the input command while the remote controller in the first operating mode, the controller controls the remote controller to suspend the providing of the multimedia content.

19. The remote controller according to claim 1, wherein if the remote controller is in one of the first and second operating modes, the remote controller is operable to receive an alert including at least one of:
    an electronic program guide (EPG) alert related to an upcoming show,
    an electronic message received from a user, and
    information relating to at least one of least news, finance and weather,
    wherein if the alert is received, the controller controls the remote controller to display the alert on a portion of the internal display screen.

20. A method of controlling a remote controller, which has an internal display screen that displays at least one digital image, which is operable to be in one of a first operating mode or a second operating mode, and which is connectable to a docking station, the method comprising:
    determining a connecting between the remote controller and the docking station and a current operating mode of the remote controller;
    in response to the remote controller being connected to the docking station and the determining that the remote controller is in the second operating mode, changing from the second operating modes to the first operating mode to provide predetermined multimedia content, and
    in response to the remote controller being connected to the docking station and the determining that the remote controller is not in the second operating mode, without changing the current operating mode,
wherein the first operating mode is a content providing mode to provide the predetermined multimedia content, and the second operating mode is a control mode to control an external device.

21. The method according to claim 20, wherein the internal display screen is a touchscreen, the method further comprising receiving at least one command from a user through the touchscreen.

22. The method according to claim 20, further comprising transmitting control commands from the remote controller to an external device for controlling the external device.

23. The method according to claim 22, wherein the external device is one of a display device, an audio outputting device and a video outputting device.

24. The method according to claim 20, further comprising storing power in a battery for operating the remote controller, wherein the docking station provides the power to the battery if the remote controller is connected to the docking station.

25. The method according to claim 20, further comprising controlling the internal display screen to display at least one digital image if the predetermined multimedia content is the at least one digital image.

26. The method according to claim 20, further comprising controlling the remote controller to play audio content if the predetermined multimedia content is the audio content.

27. The method according to claim 20, wherein the predetermined multimedia content includes different types of content, the method further comprising if the remote controller changes to the first operating mode, controlling the remote controller to provide the predetermined multimedia content such that each of the different types of content are provided in a cyclical format.

28. The method according to claim 27, wherein a predetermined priority is selected for each of the different types of content, and each of the different types of content are provided in the cyclical format according to the respective predetermined priorities selected for the different types of content.

29. The method according to claim 20, wherein the predetermined multimedia content includes at least one of:
a digital photograph,
an electronic message received from a user,
electronic program guide (EPG) content received from a content provider, and
information relating to current events.

30. The method according to claim 29, wherein if the predetermined multimedia content is the digital photograph, the digital photograph is retrieved from at least one of an internal memory, an external memory and a website.

31. The method according to claim 29, wherein if the predetermined multimedia content is the information relating to current events, the information relating to current events includes at least one of news, finance and weather.

32. The method according to claim 20,
wherein the internal display screen includes a larger portion which includes a substantial portion of the internal display screen,
wherein the control mode displays on the larger portion at least one of a control screen, which is operable to control an external device from the remote controller, and electronic program guide (EPG) information, and
wherein the content providing mode displays on a substantial portion of the internal display screen the predetermined multimedia content.

33. The method according to claim 20, wherein the internal display screen includes a smaller portion, which is separate from the larger portion,
wherein in the control mode, the predetermined multimedia content is displayed on the smaller portion, and
wherein in the content providing mode, the at least one of the control screen and the EPG information is displayed on the smaller portion.

34. The method according to claim 20, wherein the remote controller provides an initial multimedia content before being connected to the docking station,
wherein if the remote controller is changed to the first operating mode, the predetermined multimedia content is different than the initial multimedia content, and
wherein if the remote controller is in the first operating mode before being connected to the docking station, the remote controller continues to provide the initial multimedia content after being connected to the docking station.

35. The method according to claim 20, wherein if the remote controller is displaying an initial image on the internal display screen and the remote controller is changed to the first operating mode, the method further comprises: the remote controller automatically providing the multimedia content and suspending displaying the initial image on the internal display screen.

36. The remote controller apparatus according to claim 35, wherein if the remote controller is removed from the docking station, the method further comprises changing to the second operating mode, resuming the displaying the initial image on the internal display screen and suspending the providing of the multimedia content.

37. The method according to claim 20, wherein the internal display screen is operable to receive an input command, and if the internal display screen receives the input command while the remote controller in the first operating mode, the method further comprises suspending the providing of the multimedia content.

38. The method according to claim 20, wherein if the remote controller is in one of the first and second operating modes, the method further comprising receiving an alert and displaying the alert on a portion of the internal display screen, wherein the alert includes at least one of:
an electronic program guide (EPG) alert related to an upcoming show,
an electronic message received from a user, and
information relating to at least one of least news, finance and weather.

* * * * *